(12) United States Patent
Cheng et al.

(10) Patent No.: US 12,101,543 B2
(45) Date of Patent: Sep. 24, 2024

(54) OPTICAL COMPONENT DRIVING MECHANISM

(71) Applicant: TDK TAIWAN CORP., Taoyuan (TW)

(72) Inventors: Pai-Jui Cheng, Taoyuan (TW); Shu-Shan Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 210 days.

(21) Appl. No.: 17/749,526

(22) Filed: May 20, 2022

(65) Prior Publication Data

US 2023/0164411 A1 May 25, 2023

Related U.S. Application Data

(60) Provisional application No. 63/281,198, filed on Nov. 19, 2021.

(51) Int. Cl.
| | |
|---|---|
| *H04N 23/55* | (2023.01) |
| *G02B 27/64* | (2006.01) |
| *G03B 3/10* | (2021.01) |
| *G03B 13/34* | (2021.01) |
| *G03B 13/36* | (2021.01) |

(52) U.S. Cl.
CPC .............. *H04N 23/55* (2023.01); *G03B 3/10* (2013.01); *G03B 13/34* (2013.01); *G03B 13/36* (2013.01); *G02B 27/648* (2013.01)

(58) Field of Classification Search
CPC .......... H04N 23/55; G03B 3/10; G03B 13/34; G03B 13/36; G03B 5/00; G03B 30/00; G02B 27/648; G02B 27/646; G02B 7/00; G02B 7/1805; G02B 7/198

See application file for complete search history.

(56) References Cited

U.S. PATENT DOCUMENTS

| | | | | |
|---|---|---|---|---|
| 2008/0144201 A1* | 6/2008 | Koc | ...................... | G02B 7/021 |
| | | | | 359/824 |
| 2011/0292526 A1* | 12/2011 | Westerweck | ........... | G02B 7/102 |
| | | | | 359/822 |
| 2016/0142595 A1* | 5/2016 | Kim | ...................... | H04N 23/57 |
| | | | | 348/373 |
| 2019/0113705 A1* | 4/2019 | Lin | ...................... | G02B 7/021 |
| 2020/0137274 A1* | 4/2020 | Lee | ...................... | G03B 17/17 |
| 2020/0409015 A1* | 12/2020 | Kim | ...................... | G03B 3/10 |
| 2021/0018717 A1* | 1/2021 | Ichihashi | ................. | G02B 7/08 |
| 2023/0393448 A1* | 12/2023 | Lee | ...................... | G02B 27/646 |

* cited by examiner

*Primary Examiner* — Abdelaaziz Tissire

(74) *Attorney, Agent, or Firm* — MUNCY, GEISSLER, OLDS & LOWE, P.C.

(57) ABSTRACT

An optical component driving mechanism is provided. The optical component driving mechanism includes a fixed portion, a movable portion, and a driving assembly. The movable portion and the fixed portion are arranged along a main axis. The movable portion is movable relative to the fixed portion. The driving assembly is configured to drive the movable portion to move relative to the fixed portion. The fixed portion includes a first guide component for guiding the movable portion to move relative to the fixed portion.

18 Claims, 10 Drawing Sheets

OPTICAL COMPONENT DRIVING MECHANISM

CROSS REFERENCE TO RELATED APPLICATIONS

This application claims the benefit of U.S. Provisional Application No. 63/281,198 filed 19 Nov. 2021, the entirety of which is incorporated by reference herein.

BACKGROUND OF THE INVENTION

Field of the Invention

The present disclosure relates to an optical component driving mechanism, and more particularly to an optical component driving mechanism with a guide component.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical component driving mechanism to drive an optical component (such as a lens) to move along its optical axis, thereby achieving auto focus (AF) or optical image stabilization (OIS). Light may pass through the optical component and may form an image on an optical sensor. However, the trend in modern mobile devices is to have a smaller size and a higher durability. As a result, how to effectively reduce the size of the optical component driving mechanism and how to increase its durability has become an important issue.

BRIEF SUMMARY OF THE INVENTION

An optical component driving mechanism is provided. The optical component driving mechanism includes a fixed portion, a movable portion, and a driving assembly. The movable portion and the fixed portion are arranged along the main axis. The movable portion is movable relative to the fixed portion. The driving assembly is configured to drive the movable portion to move relative to the fixed portion. The fixed portion includes a first guide component for guiding the movable portion to move relative to the fixed portion.

According to some embodiments of the present disclosure, the movable portion includes a receiving portion for containing the first guide component, so that the movable portion is movable relative to the fixed portion with the guidance of the first guide component.

According to some embodiments of the present disclosure, the movable portion includes a first notch located on the same side of the movable portion as the receiving portion.

According to some embodiments of the present disclosure, the optical component driving mechanism further includes a contact component covering the first guide component. When the movable portion moves relative to the fixed portion, the receiving portion moves along the main axis in a manner that contains the first guide component and makes contact with the contact component.

According to some embodiments of the present disclosure, the first guide component includes a plurality of protruding portions. When the movable portion moves relative to the fixed portion, the receiving portion moves along the main axis in a manner that contains the first guide component and makes contact with the first guide component.

According to some embodiments of the present disclosure, the protruding portions protrude from opposite sides of the first guide component. The protruding portions have the shape of a long bar extending along the main axis.

According to some embodiments of the present disclosure, the protruding portions include a plurality of convex portions and a plurality of concave portions. The plurality of convex portions are spaced a fixed distance apart. The plurality of concave portions are each located between each protruding portion. The protruding portions present a wavy shape when viewed in a direction perpendicular to the main axis.

According to some embodiments of the present disclosure, the optical component driving mechanism further includes a second guide component. The movable portion includes a first opening and a plurality of second openings. The driving assembly passes through the first opening. The second guide component passes through the second openings.

According to some embodiments of the present disclosure, the movable portion includes a first side, a second side, and a receiving portion. The first side and the second side are respectively located on opposite sides of the movable portion. The receiving portion is positioned on the first side. The first opening and the second openings are positioned on the second side.

According to some embodiments of the present disclosure, the movable portion further includes a second notch located between the second openings.

According to some embodiments of the present disclosure, the optical component driving mechanism further includes a first elastic component and a second elastic component. The first elastic component and the second elastic component is positioned in the first opening. The first elastic component and the second elastic component surround the driving assembly. The driving assembly is movably connected to the movable portion via the first elastic component and the second elastic component.

According to some embodiments of the present disclosure, the optical component driving mechanism further includes an adhesive component disposed between the first opening and the first elastic component, to fix the first elastic component.

According to some embodiments of the present disclosure, the fixed portion includes a third opening. The driving assembly passes through the third opening. The first opening and the third opening at least partially overlap when viewed along the main axis.

According to some embodiments of the present disclosure, the optical component driving mechanism further includes a first buffer component and a second buffer component. The fixed portion further includes a ring structure. The first buffer component is located between the driving assembly and the ring structure. The second buffer component is located between the driving assembly and the third opening.

According to some embodiments of the present disclosure, the ring structure surrounds the driving assembly to position the driving assembly.

According to some embodiments of the present disclosure, the optical component driving mechanism further includes a strengthening portion embedded in the fixed portion.

According to some embodiments of the present disclosure, the optical component driving mechanism further includes a circuit assembly electrically connected to the strengthening portion.

According to some embodiments of the present disclosure, the movable portion includes a plurality of first stopper components and a plurality of second stopper components. The fixed portion includes a front wall and a rear wall. The front wall is parallel to the rear wall. The first stopper components contact the front wall when the movable portion moves into the first limit position. The second stopper components contacts the rear wall when the movable portion moves into the second limit position.

According to some embodiments of the present disclosure, the optical component driving mechanism further includes a sensing assembly for sensing the movement of the movable portion relative to the fixed portion. The sensing assembly includes a sensing component and a magnetic component. The sensing component is disposed on the fixed portion, and the magnetic component is disposed on the movable portion.

According to some embodiments of the present disclosure, the first guide component is formed on the fixed portion by injection molding.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
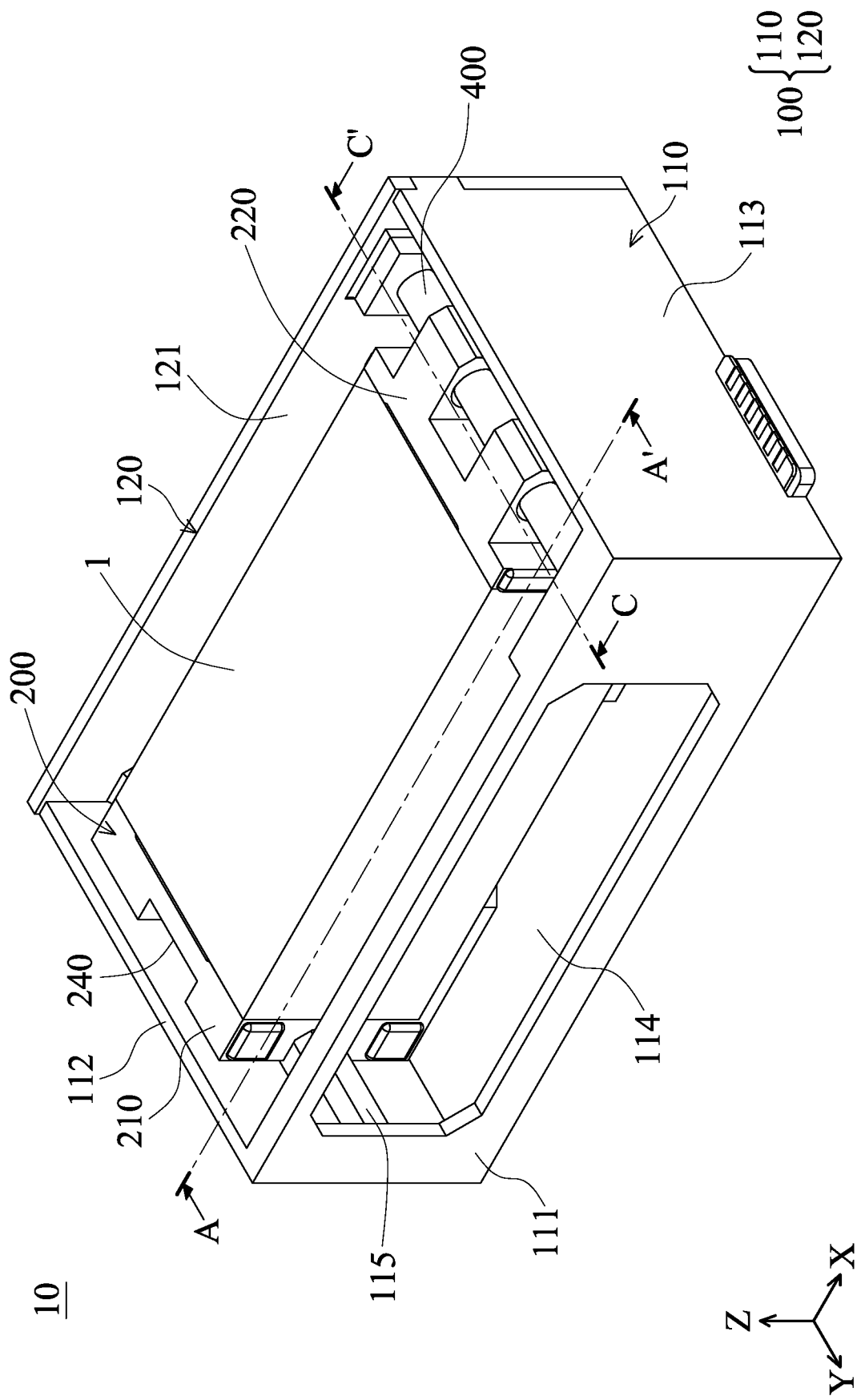
FIG. 1A is a perspective view of an optical component driving mechanism, according to certain aspects of the present disclosure.

The present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
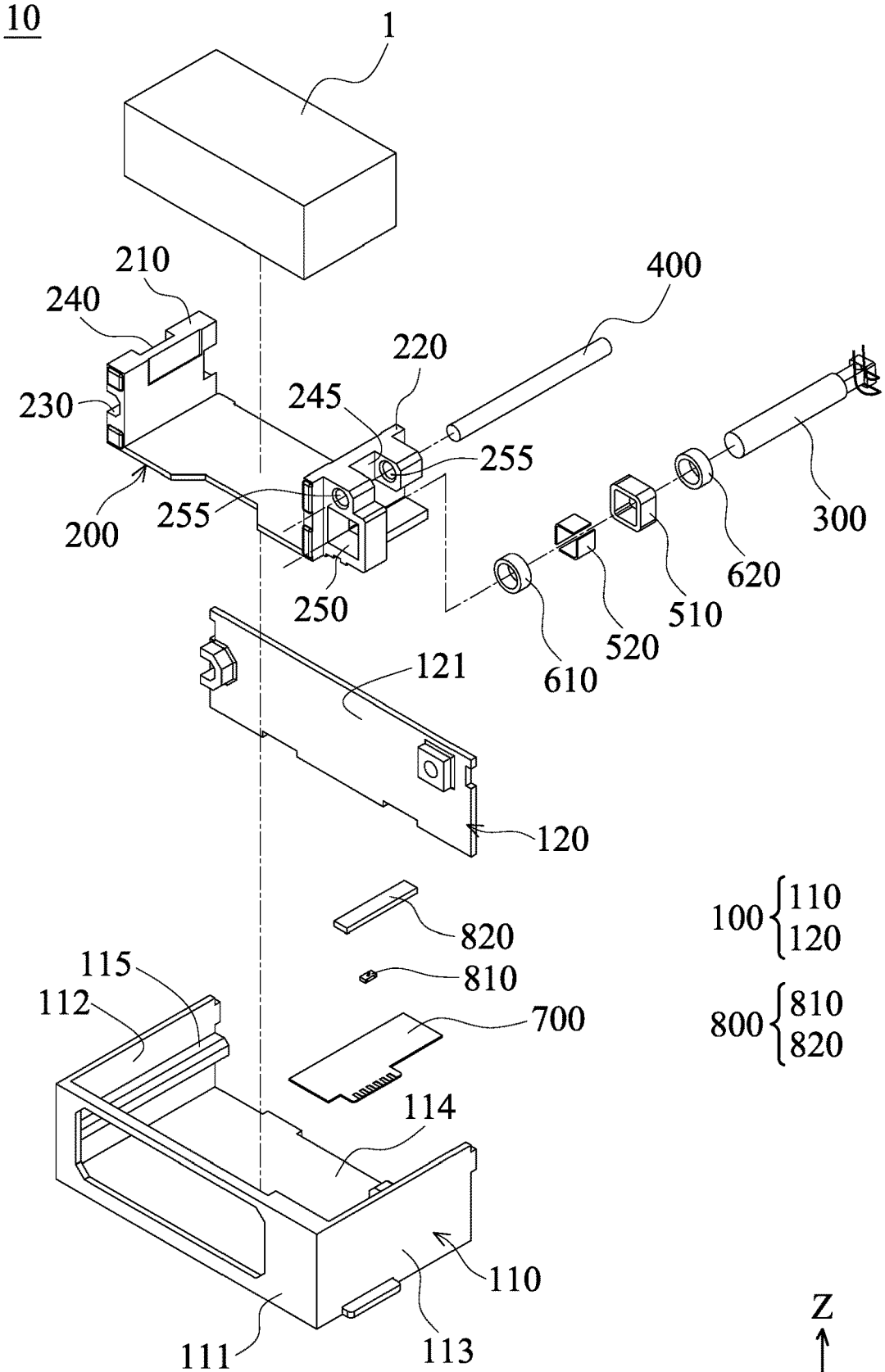
FIG. 1B is an exploded view of an optical component driving mechanism, according to certain aspects of the present disclosure.
Figure 1C:
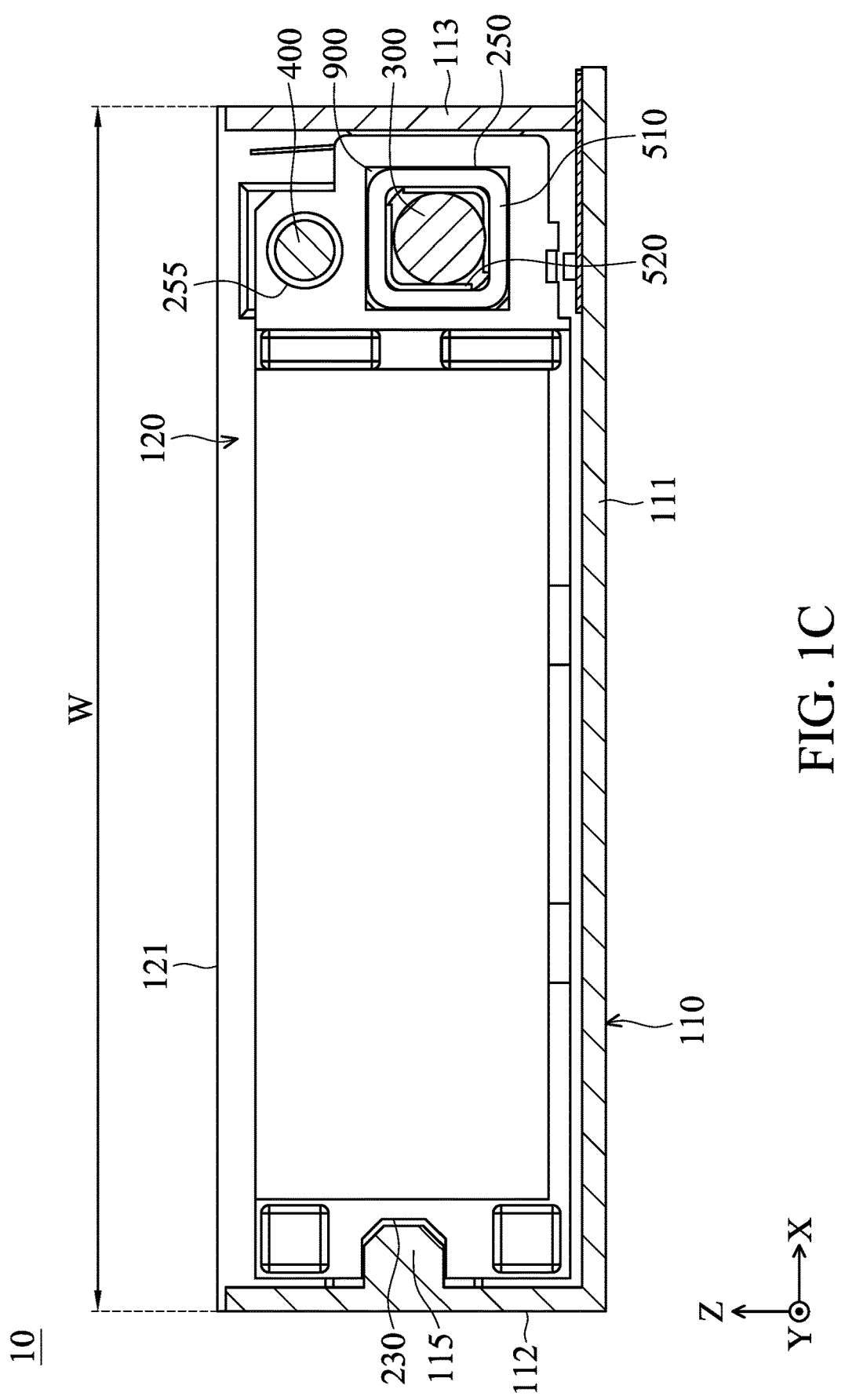
FIG. 1C is a cross-sectional view of the optical component driving mechanism taken along the line A-A' in FIG. 1A.

FIG. 1A is a perspective view of an optical component driving mechanism 10, according to certain aspects of the present disclosure. FIG. 1B is an exploded view of the optical component driving mechanism 10, according to certain aspects of the present disclosure. FIG. 1C is a cross-sectional view of the optical component driving mechanism 10 taken along the line A-A' in FIG. 1A.

Figure 4A:
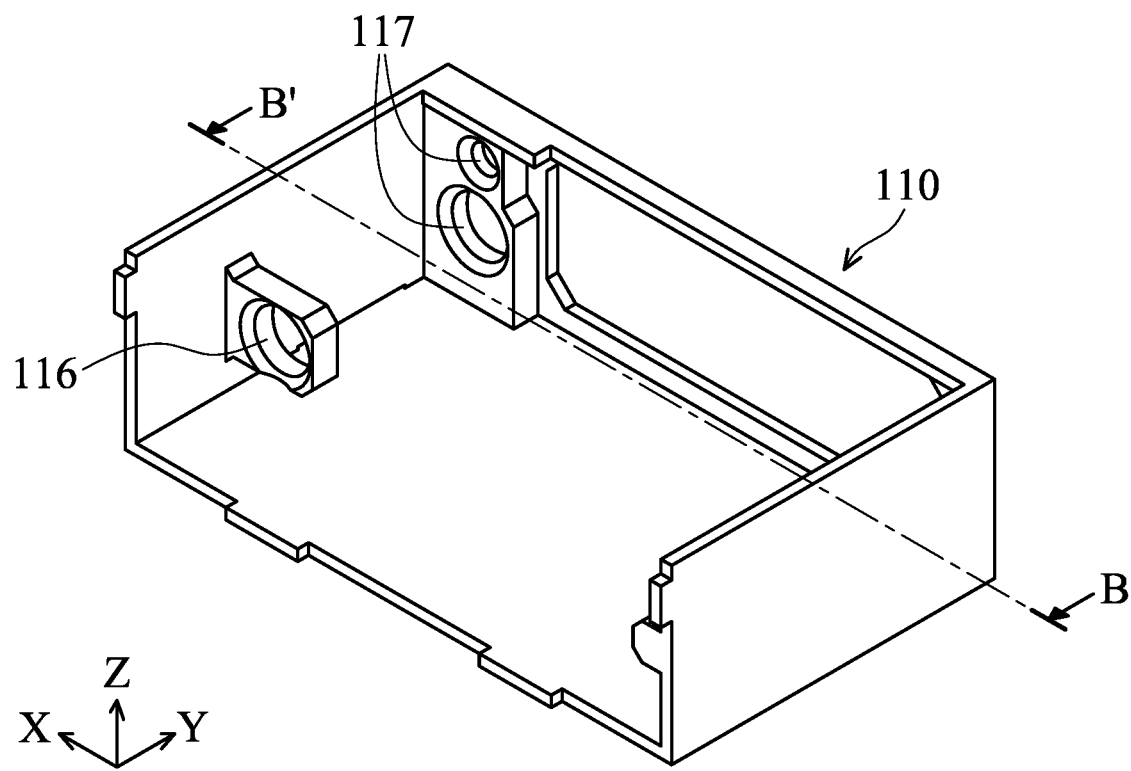
FIG. 4A is a perspective view of a first housing, according to certain aspects of the present disclosure.
Figure 4B:
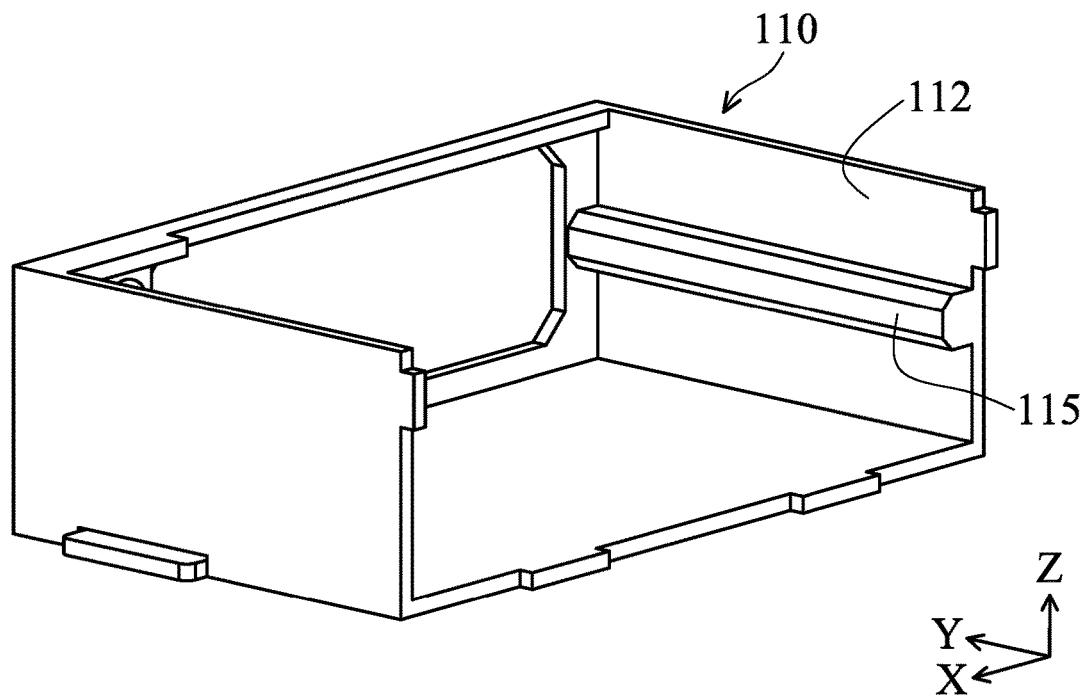
FIG. 4B is a perspective view of the first housing viewed from another angle, according to certain aspects of the present disclosure.
Figure 4C:
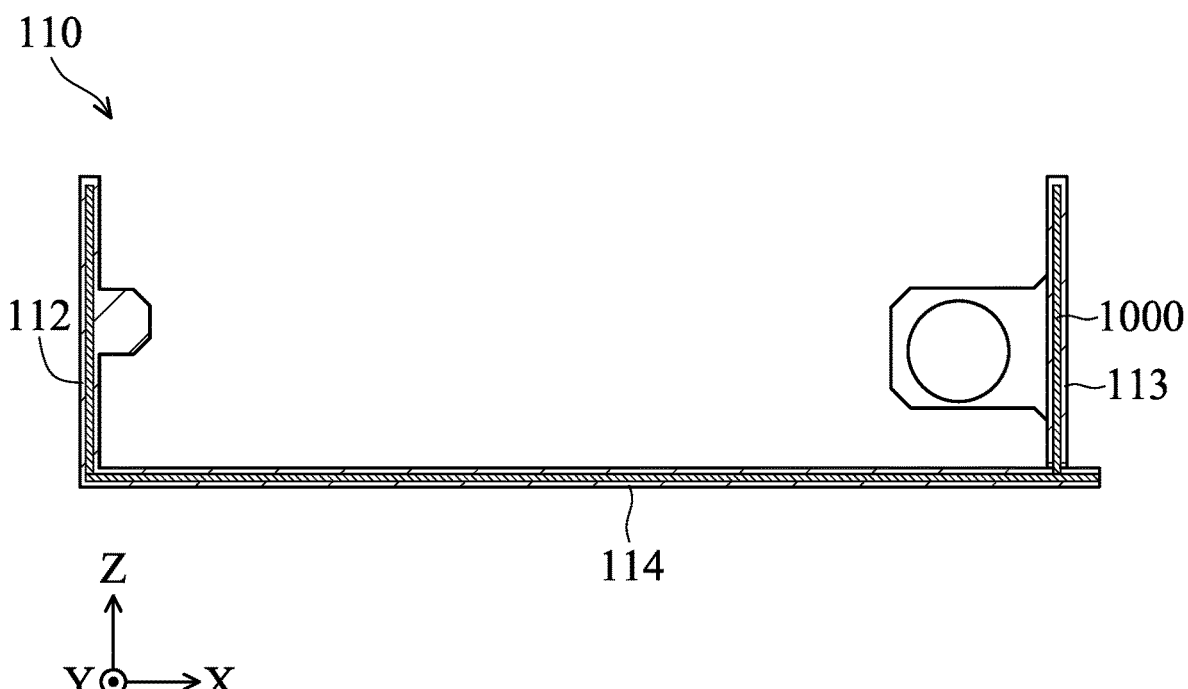
FIG. 4C is a cross-sectional view of the first housing taken along the line B-B' of FIG. 4A.

Please refer to FIGS. 1A-1C together, the optical component driving mechanism 10 includes a fixed portion 100, a movable portion 200, a driving assembly 300, a first elastic component 510, a second elastic component 520, a first buffer component 610, a second buffer component 620, a circuit assembly 700, a sensing assembly 800, a plurality of adhesive components 900, and a strengthening portion 1000 (FIG. 4C).

The fixed portion 100 includes a first housing 110 and a second housing 120. The first housing 110 includes a front wall 111, a first sidewall 112, a second sidewall 113, a third sidewall 114, and a first guide component 115. The second housing 120 includes a rear wall 121.

The front wall 111 is perpendicular to the first sidewall 112, the second sidewall 113, and the third sidewall 114. The front wall 111 is parallel to the rear wall 121. The first sidewall 112 is parallel to the second sidewall 113. The first guide component 115 protrudes toward the second sidewall 113 from the first sidewall 112. In details, the first guide component 115 is formed on the first sidewall 112 by injection molding.

The movable portion 200 is a carrier for carrying an optical component 1. The movable portion 200 includes a first side 210, a second side 220, two receiving portions 230, a first notch 240, a second notch 245, a first opening 250, two second openings 255, a set of first stopper components 260 (FIGS. 2A-2B), a set of second stopper components 265 (FIGS. 2A-2B), and a groove 270 (FIG. 3C).

The movable portion 200 and the fixed portion 100 are arranged along a main axis (the Y-direction), and the movable portion 200 is movable between a first limit position and a second limit position along the main axis (the Y-direction). For the purpose of illustration, the first side 210 refers to the side of the movable portion 200 that is closest to the first sidewall 112. The second side 220 refers to the side of the movable portion 200 that is closest to the second sidewall 113. The first side 210 and the second side 220 are located on opposite sides of the movable portion 200. The receiving portion 230 and the first notch 240 are located on the first side 210. The receiving portion 230 contains the first guide component 115, so that with the guidance of the first guide component 115, the movable portion 200 is movable relative to the fixed portion 100. The structure of the receiving portion 230 and the first notch 240 is shown more clearly in relation to FIG. 3A.

The second notch 245, the first opening 250, and the second openings 255 are located on the second side 220. The second notch 245 is located between the two second openings 255. The driving assembly 300 passes through the first opening 250. The optical component driving mechanism 10 further includes a second guide component 400, and the second guide component 400 passes through the second openings 255.

In some embodiments, the material of the driving assembly 300 may include a piezoelectric material. When an electric field (voltage) is applied to the surface of the piezoelectric material, the electric dipole moment will be elongated due to the action of the electric field. In order to resist the change, the piezoelectric material will be elongated in the direction of the electric field, so that mechanical deformation may be generated. Thereby, the driving assembly 300 may be driven to move.

The driving assembly 300 may drive the movable portion 200 to move relative to the fixed portion 100. In detail, since the movable portion 200 is movably connected to the first guide component 115 and the second guide component 400, the movable portion 200 may moves along the main axis (the Y-direction) with the guidance of the first guide component 115 and the second guide component 400 when driven by the driving assembly 30. In some embodiments, the first guide component 115 is made of plastic material, and the second guide component 400 is made of metal.

When the optical component driving mechanism 10 is impacted by an external force (e.g., dropped to the ground), the configuration of the second guide component 400 may withstand part of the impact force to avoid damage to the driving assembly 300. In addition, with the configuration of the first guide component 115 and the second guide component 400, the situation of tilting when the movable portion 200 is driven may be improved.

The first elastic component 510 and the second elastic component 520 are positioned in the first opening 250. The first elastic component 510 and the second elastic component 520 surround the driving assembly 300. In detail, the driving assembly 300 is disposed in the second elastic component 520, and the second elastic component 520 is disposed in the first elastic component 510. The driving assembly 300 is movably connected to the movable portion 200 via the first elastic component 510 and the second elastic component 520.

The first elastic component 510 and the second elastic component 520 may be made of different materials. For example, in some embodiments, the first elastic component 510 may include a soft material (e.g., silicone, rubber, etc.), and the second elastic component 520 may include a metal material. The configuration of the first elastic component 510 may provide the clamping force for fixing the second elastic component 520, and may reduce the noise generated when the optical component driving mechanism 10 is actuated. The first elastic component 510 and the second elastic component 520 are movably connected to the driving assembly 300 by frictional contact, so as to define the position of the driving assembly 300.

It should be understood that, when viewed along the main axis (the Y-direction), the first opening 250, the first elastic component 510, and the second elastic component 520 are all approximately in the shape of a square in the present embodiment. However, the present disclosure does not limit the shapes of the first opening 250, the first elastic component 510, and the second elastic component 520. In different embodiments, the first opening 250, the first elastic component 510, and the second elastic component 520 may be in the shape of a circle, etc.

Figure 5:
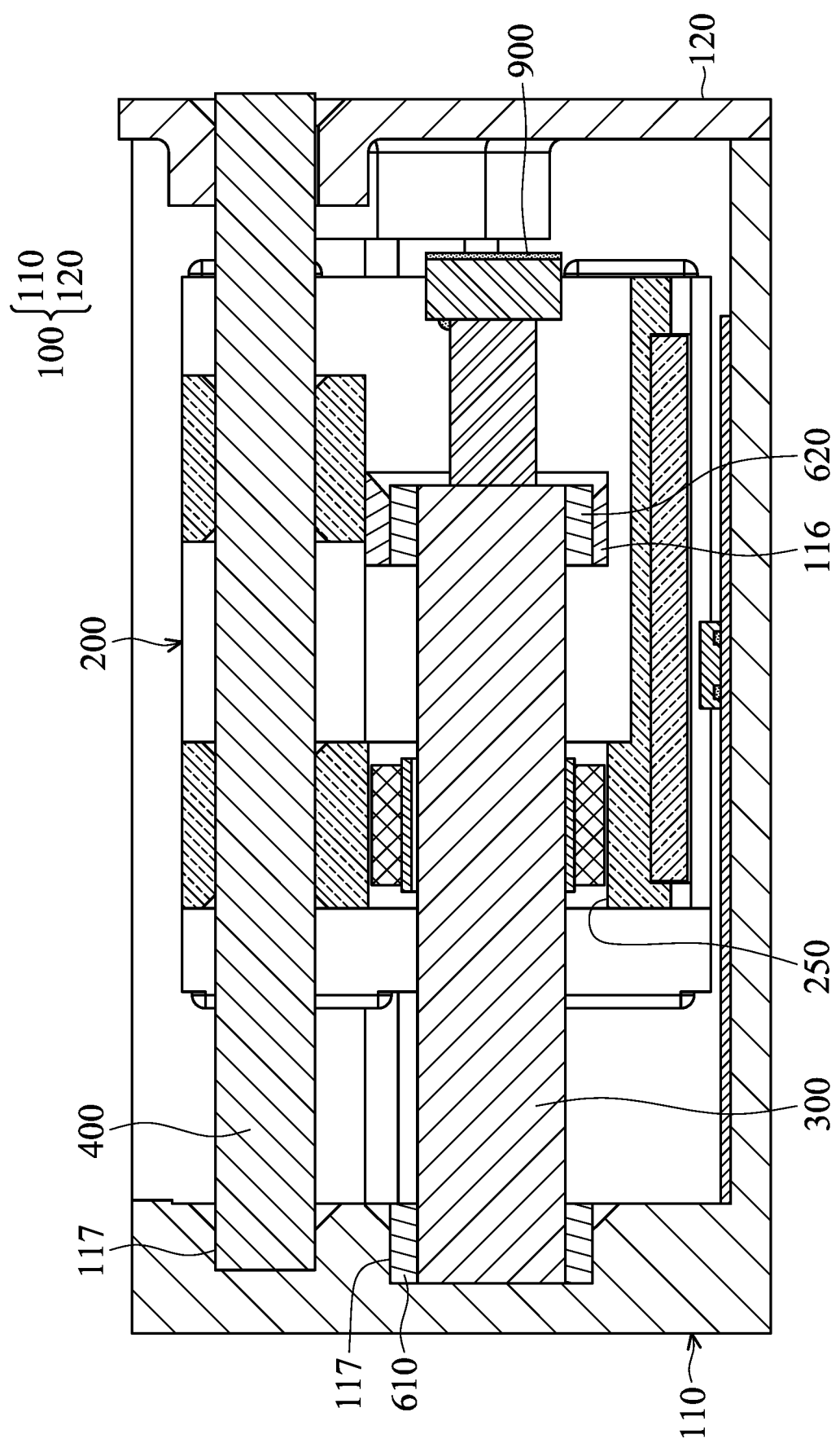
FIG. 5 is a cross-sectional view of the optical component driving mechanism taken along the line C-C' of FIG. 1A.

The first buffer component 610 and the second buffer component 620 are each disposed on the driving assembly 300, and the details thereof is described in detail in relation to FIG. 5. The circuit assembly 700 has a plate-like structure. The circuit assembly 700 is disposed on the third sidewall 114. The sensing assembly 800 is electrically connected to the circuit assembly 700.

The sensing assembly 800 senses the movement of the movable portion 200 relative to the fixed portion 100. The sensing assembly 800 includes a sensing component 810 and a magnetic component 820. In this embodiment, the sensing component 810 is disposed on the circuit assembly 700, and is electrically connected to the circuit assembly 700. The magnetic component 820 is disposed on the movable portion 200. In some embodiments, the positions of the sensing component 810 and the magnetic component 820 may also be interchanged, depending on design requirements.

In some embodiments, the sensing component 810 may include sensing components such as, a Hall sensor, a magnetoresistance effect sensor (MR Sensor), a giant magnetoresistance effect sensor (GMR Sensor), tunneling magnetoresistance effect sensor (TMR Sensor), or Fluxgate Sensor, depending on design requirements.

Please refer to FIG. 1C, the adhesive component 900 is disposed between the first opening 250 and the first elastic component 510, to fix the first elastic component 510. As shown in FIG. 1C, in the present embodiment, the first guide component 115 and the second guide component 400 are located at different levels when viewed in the Y-direction. In another embodiment, the first guide component 115 and the second guide component 400 may be located at the same level when viewed in the Y-direction, depending on design requirements.

It should be understood that the present invention does not limit the positions and numbers of the receiving portion 230, the first guide component 115, and the second guide component 400. In different embodiments, the receiving portions 230, the first guide components 115, and the second guide component 400 may be of different numbers and located in different locations, depending on design requirements.

Compared with the prior art, using a guide component separated from the fixed portion to guide the movable portion to move relative to the fixed portion results in the optical component driving mechanism having a larger size in width. As shown in FIG. 1C, the first guide component 115 of the present invention is formed on the first sidewall 112 by injection molding. Therefore, the configuration of the first guide component 115 may results in sized reduction in the width W of the optical component driving mechanism 10 and miniaturization.

Figure 2A:
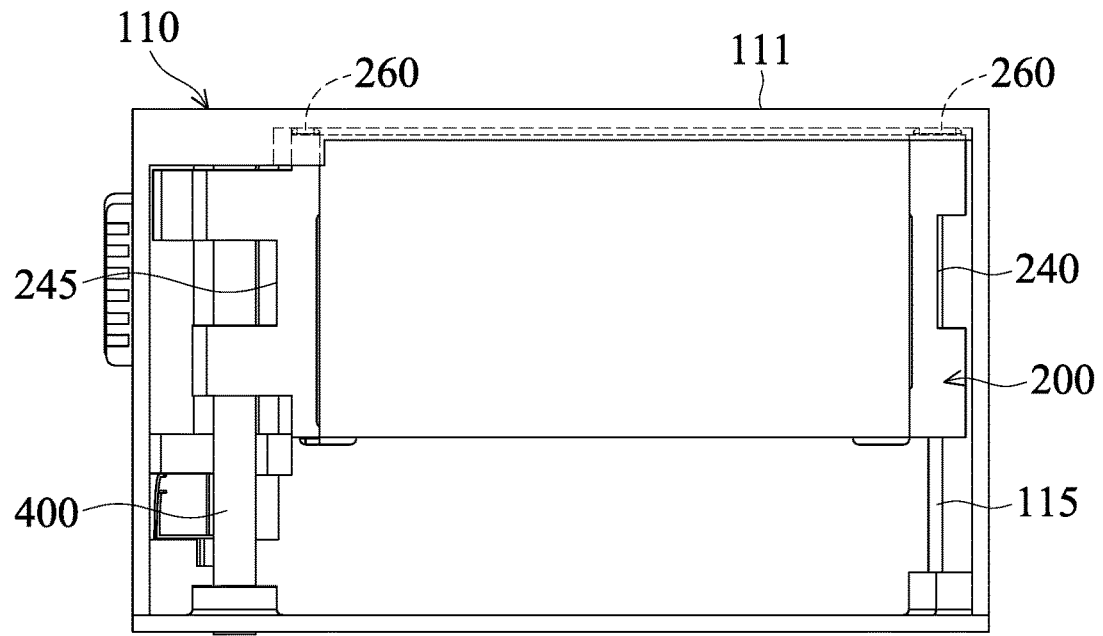
FIG. 2A is a top view of the optical component driving mechanism when the movable portion is in the first limit position.
Figure 2B:
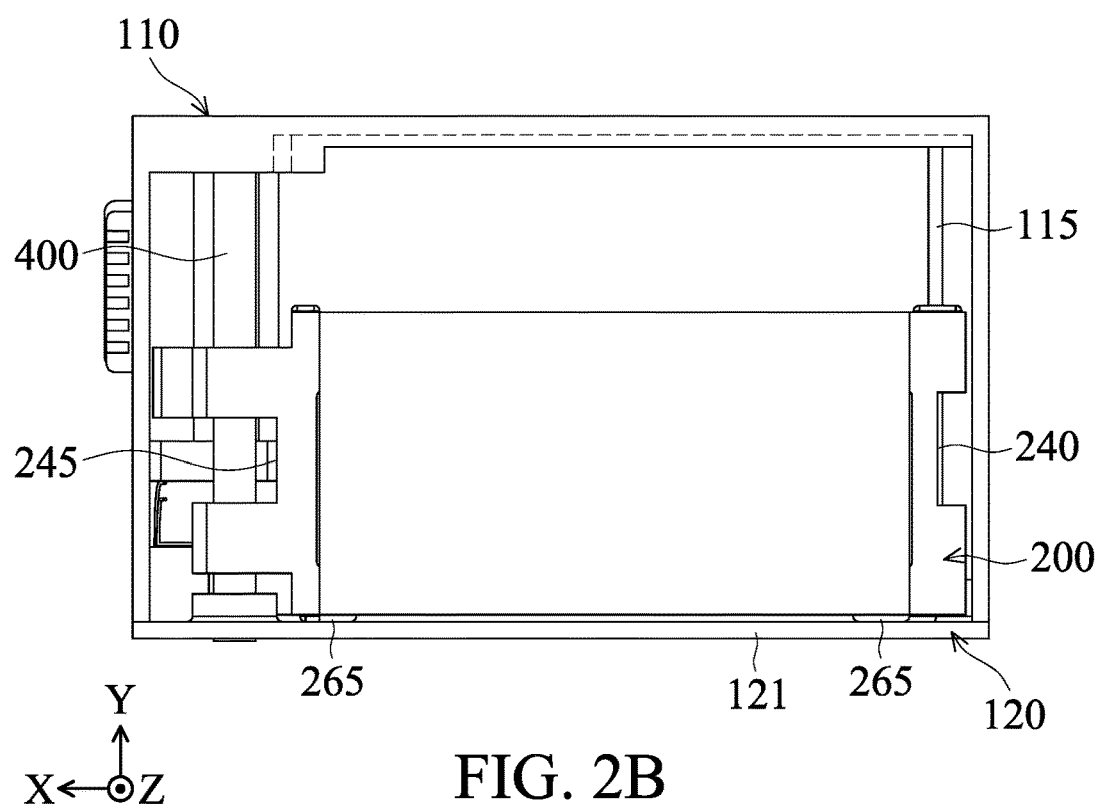
FIG. 2B is a top view of the optical component driving mechanism when the movable portion is in the second limit position.

FIG. 2A is a top view of the optical component driving mechanism 10 when the movable portion 200 is in the first limit position. FIG. 2B is a top view of the optical component driving mechanism 10 when the movable portion 200 is in the second limit position. As shown in FIG. 2A, when the movable portion 200 is located in the first limit position, the first stopper component 260 contacts the front wall 111. As shown in FIG. 2B, when the movable portion 200 is located in the second limit position, the second stopper component 265 contacts the rear wall 121.

The first notch 240 and the second notch 245 can be seen in FIGS. 2A-2B. The configuration of the first notch 240 and the second notch 245 may reduce the friction force between the first guide component 115 and the movable portion 200 and the friction force between the second guide component 400 and the movable portion 200. The configuration of the first notch 240 and the second notch 245 may also increase the speed of the movable portion 200 moving, and may reduce drive voltage.

Figure 3A:
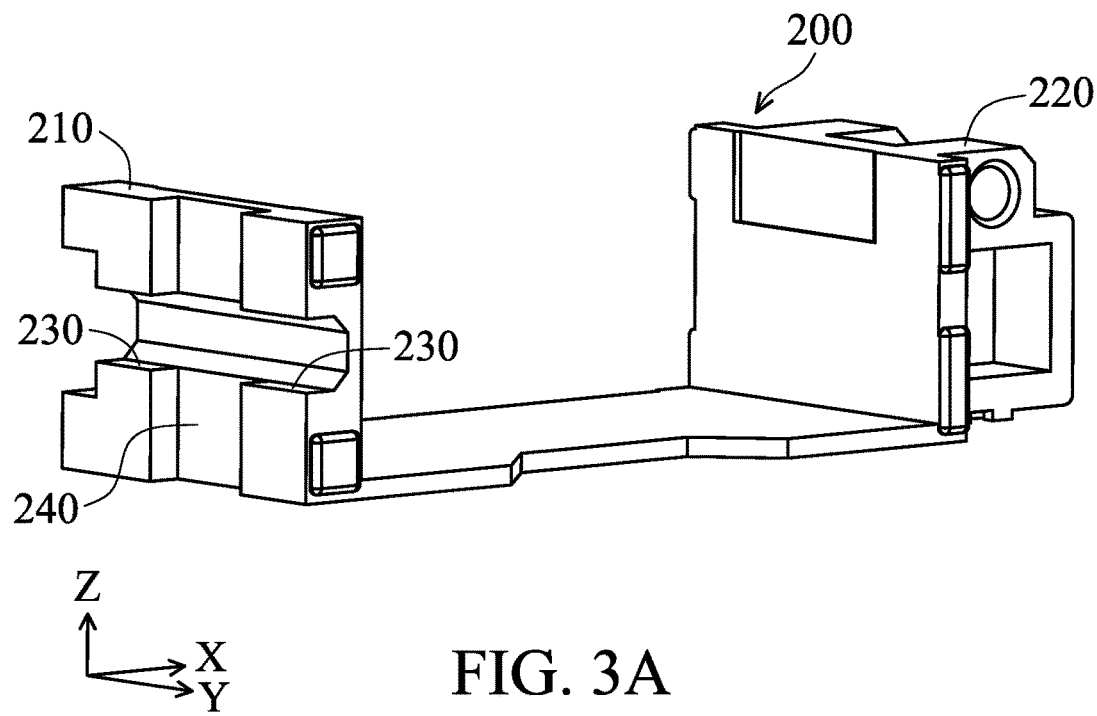
FIG. 3A is a perspective view of a movable portion, according to certain aspects of the present disclosure.

FIG. 3A is a perspective view of the movable portion 200, according to certain aspects of the present disclosure. The two receiving portions 230 on the first side 210 and the first notch 240 between the two receiving portions 230 can be seen in FIG. 3A. It should be understood that, the receiving portion 230 is a structure that contains the first guide component 115 (FIG. 1C). The configuration of the first notch 240 reduces the contact area between the movable portion 200 and the first guide component 115, and thus reduces the frictional force when the movable portion 200 moves.

Figure 3B:
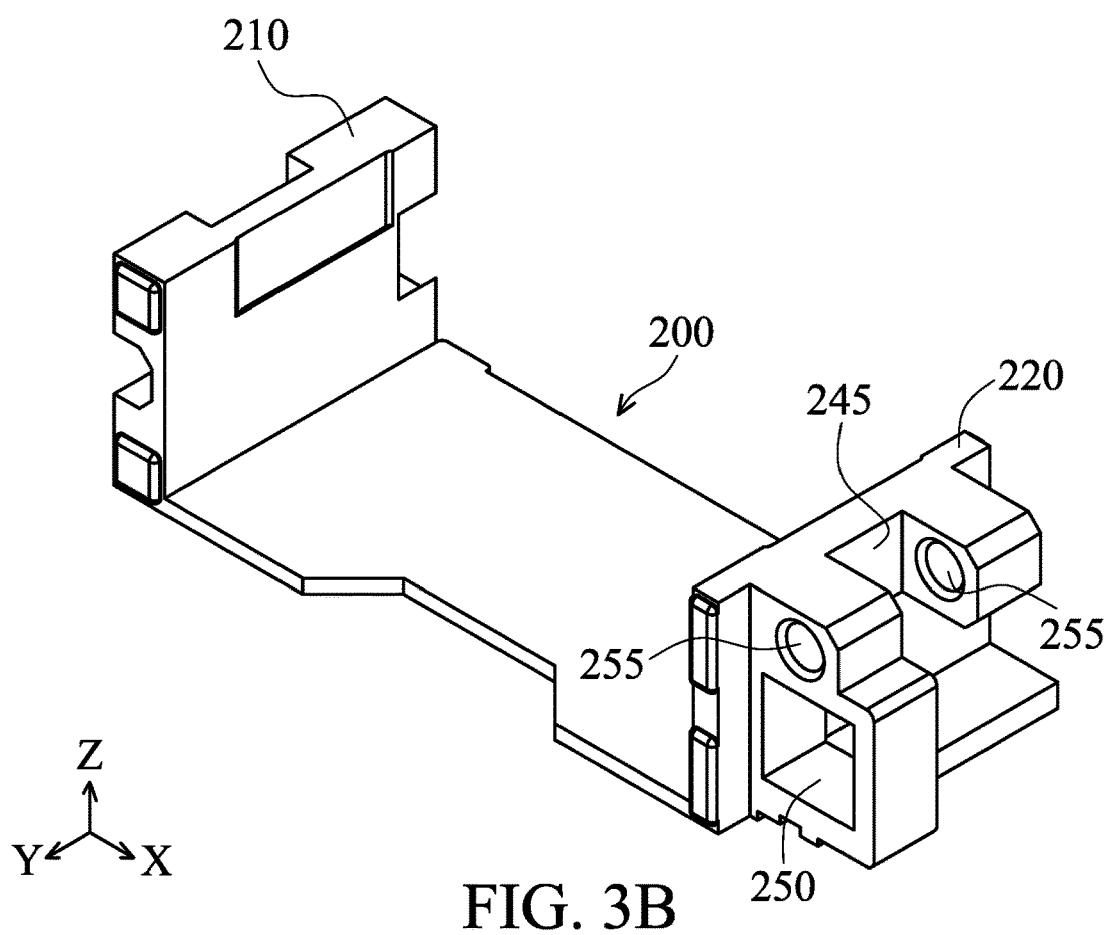
FIG. 3B is a perspective view of the movable portion viewed from another angle, according to certain aspects of the present disclosure.
Figure 3C:
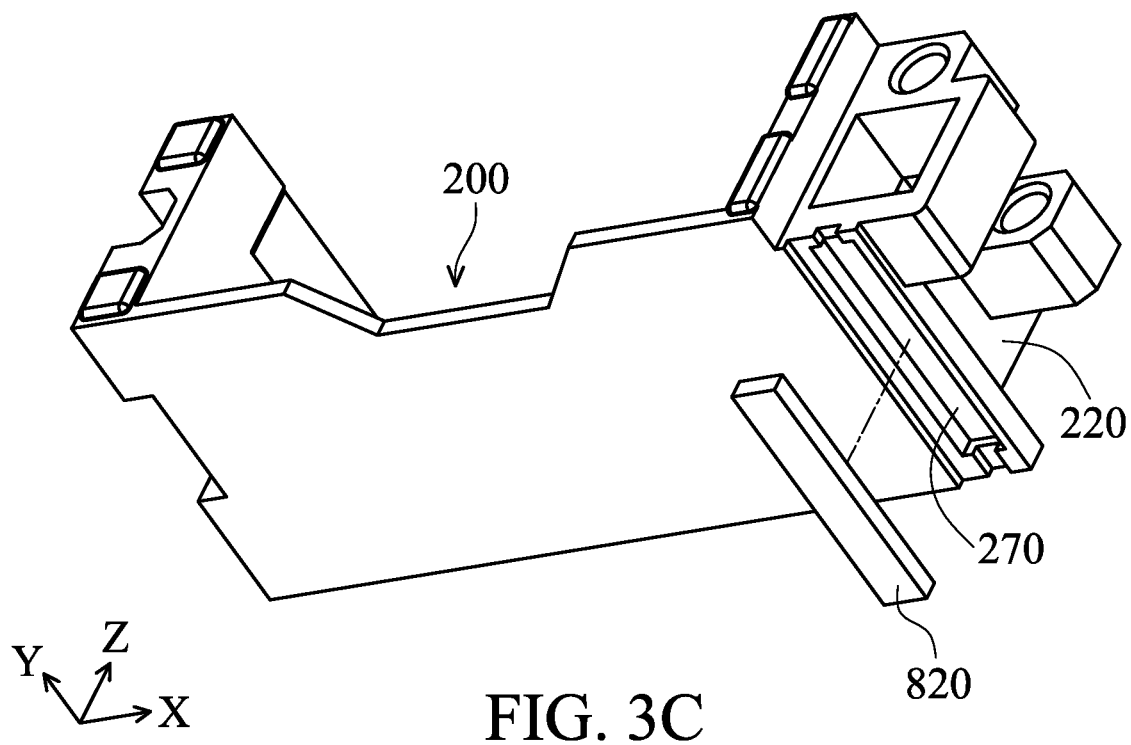
FIG. 3C is a perspective view of a movable portion and a magnetic component, according to certain aspects of the present disclosure.

FIG. 3B is a perspective view of the movable portion 200, according to certain aspects of the present disclosure. The second notch 245, the first opening 250, and the second openings 255 on the second side 220 can be seen in FIG. 3B. The two second openings 255 are substantially coaxial. The second notch 245 is located between the two second openings 255.

The configuration of the second notch 245 reduces the contact area between the second guide component 400 (FIG. 2A) and the movable portion 200, and thus reduces the frictional force between the second guide component 400 and the movable portion 200. Therefore, the movable portion 200 may have better performance.

FIG. 3C is a perspective view of the movable portion 200 and the magnetic component 820, according to certain aspects of the present disclosure. The groove 270 under the second side 220 can be seen in FIG. 3C. The magnetic component 820 is disposed in the groove 270, so that the optical component driving mechanism 10 may be miniaturized.

FIG. 4A is a perspective view of the first housing 110, according to certain aspects of the present disclosure. As shown in FIG. 4A, the fixed portion 100 further includes a third opening 116 and two ring structures 117. The third opening 116 is substantially coaxial with one of the ring structure 117, and the third opening 116 and this ring structure 117 are configured to fix the driving assembly 300 (FIG. 1B). Another ring structure 117 is configured to fix the second guide component 400 (FIG. 1B).

FIG. 4B is a perspective view of the first housing 110, according to certain aspects of the present disclosure. The first guide component 115 on the first sidewall 112 can be seen in FIG. 4B. The first guide component 115 has a polygonal shape and extends in the direction of the main axis (the Y-direction).

FIG. 4C is a cross-sectional view of the first housing 110 taken along the line B-B' of FIG. 4A. The strengthening portion 1000 is embedded in the first sidewall 112, the second sidewall 113, and the third sidewall 114 of the first housing 110. In some embodiments, the strengthening portion 1000 may be a metal sheet. The configuration of the strengthening portion 1000 may increase the strength and flatness of the first housing 110.

In some embodiments, the strengthening portion 1000 may be electrically connected to the circuit assembly 700 (FIG. 1B). In some embodiments, the first housing 110 may include a circuit made by laser direct structuring (LDS) technology, and the strengthening portion 1000 may be electrically connected to the circuit.

FIG. 5 is a cross-sectional view of the optical component driving mechanism 10 taken along the line C-C' of FIG. 1A. The two ring structures 117 surround the driving assembly 300 and the second guide component 400, respectively, to position the driving assembly 300 and the second guide component 400.

The first buffer component 610 is located between the driving assembly 300 and the ring structure 117. The second buffer component 620 is located between the driving assembly 300 and the third opening 116. The driving assembly 300 passes through the first opening 250 of the movable portion 200 and the third opening 116 of the first housing 110. The first opening 250 and the third opening 116 at least partially overlap when viewed along the main axis (the Y-direction).

When the optical component driving mechanism 10 is impacted by an external force, the first buffer component 610 and the second buffer component 620 will buffer the external force to prevent the driving assembly 300 from being damaged. The adhesive member 900 is disposed between one end of the driving assembly 300 and the fixed portion 100. It should be understood that the adhesive component 900 is depicted here for illustrative purposes only and does not represent an actual size.

Figure 6A:
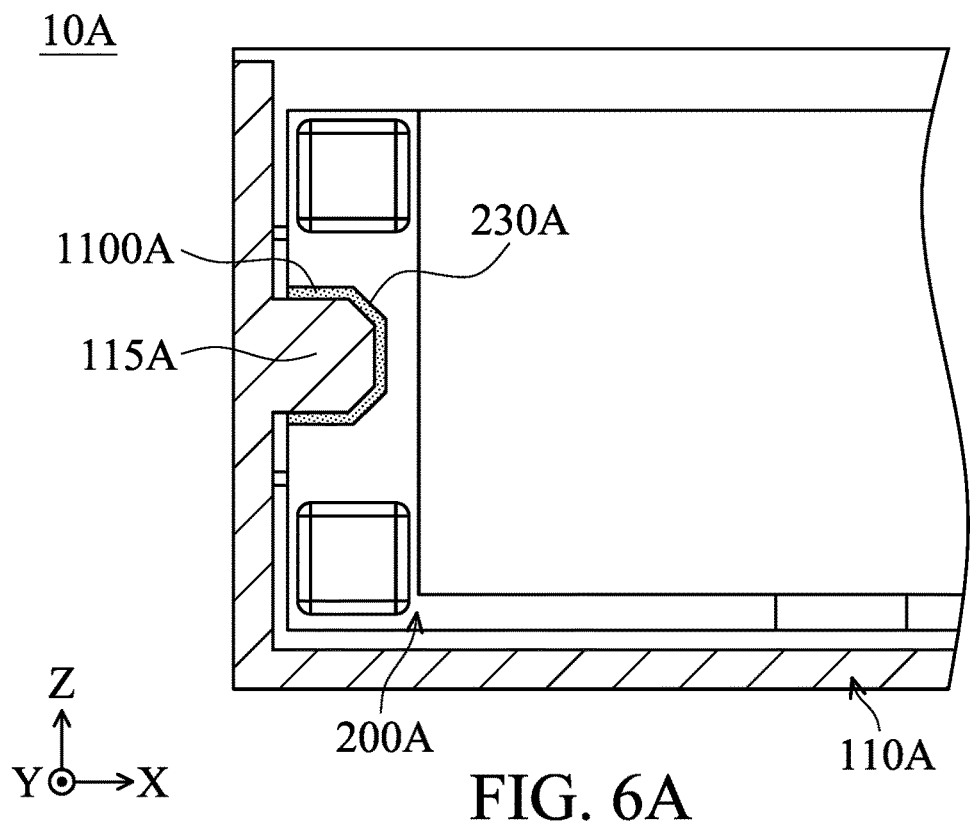
FIG. 6A is a schematic diagram of an optical component driving mechanism according to another embodiment.

FIG. 6A is a schematic diagram of an optical component driving mechanism 10A according to another embodiment.

In the embodiment shown in FIG. 6A, the optical component driving mechanism 10A further includes a contact component 1100A. The contact component 1100A is disposed on the surface of the first guide component 115A, covering the first guide component 115A. The contact component 1100A may be a metal sheet or lubricant. In some embodiments, the contact component 1100A includes both a metal sheet and a lubricant.

When the movable portion 200A moves relative to the first housing 110A, the receiving portion 230A moves along the main axis (the Y-direction) in a manner that contains the first guide component 115A and makes contact with the contact member 1100A. With the configuration of the contact component 1100A, the frictional force between the first guide component 115A and the receiving portion 230A may be reduced, thereby improving the performance of the optical component driving mechanism 10A.

Figure 6B:
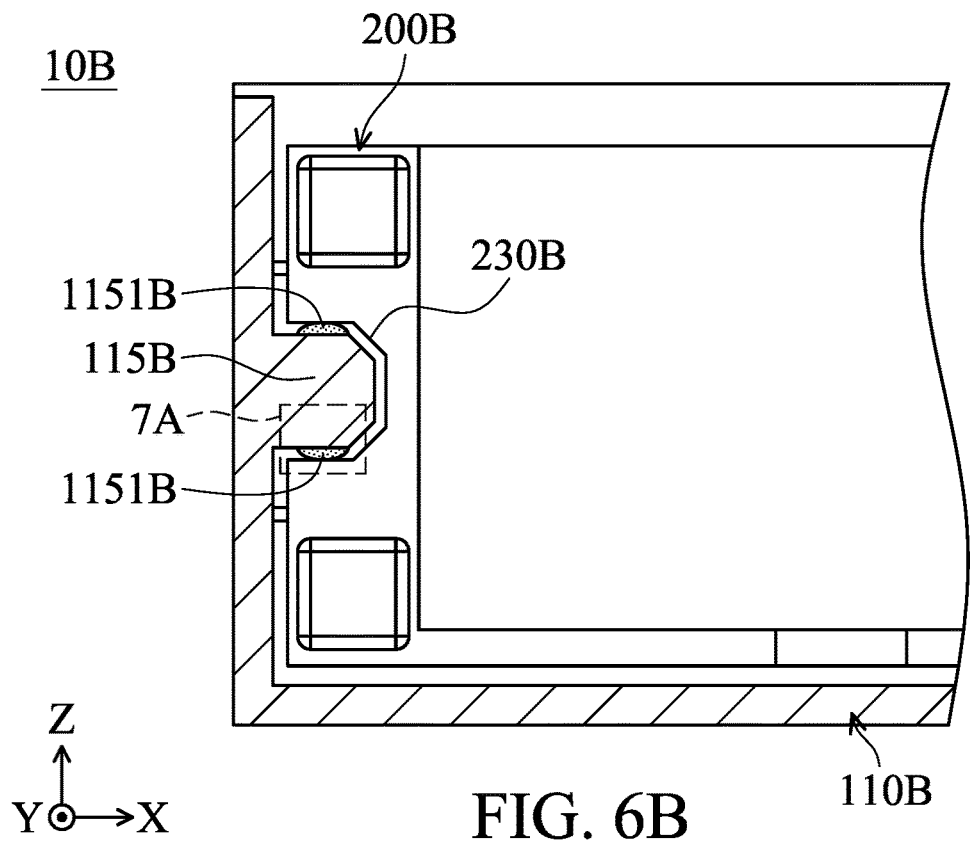
FIG. 6B is a schematic diagram of an optical component driving mechanism according to yet another embodiment.

FIG. 6B is a schematic diagram of an optical component driving mechanism 10B according to yet another embodiment. In some embodiments, the first guide component 115B may include two protruding portions 1151B. As shown in FIG. 6B, the protruding portions 1151B may be disposed on opposite sides of the first guide component 115B. When the movable portion 200B moves relative to the first housing 110B, the receiving portion 230B moves along the main axis (the Y-direction) in a manner that contains the first guide component 115B and makes contact with the protruding portions 1151B.

The protruding portions 1151B may reduce the contact area between the first guide component 115B and the receiving portion 230B, and thus reduce the frictional force between the first guide component 115B and the receiving portion 230B, thereby improving the performance of the optical component driving mechanism 10B. In one embodiment, the first housing 110B, the first guide component 115B, and the protruding portions 1151B are all made of plastic material. In another embodiment, the protruding portions 1151B are made of metal material.

Figure 7A:
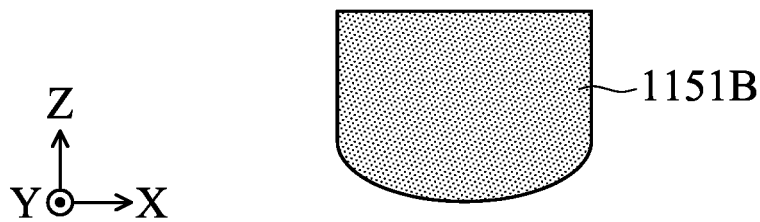
FIG. 7A is a schematic diagram of the protruding portion shown by the dash frame in FIG. 6B.
Figure 7B:
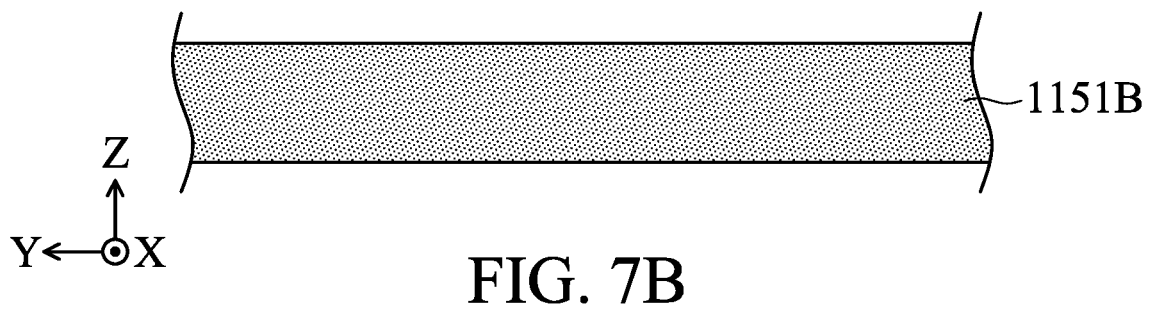
FIG. 7B is a side view of the protruding portion in FIG. 7A.

FIG. 7A is a schematic diagram of the protruding portion 1151B shown by the dash frame 7A in FIG. 6B. FIG. 7B is a side view of the protruding portion 1151B in FIG. 7A. As shown in FIG. 7B, when viewed in the direction perpendicular to the main axis (the X-direction), the protruding portion 1151B has the shape of a long bar extending along the main axis.

Figure 7C:
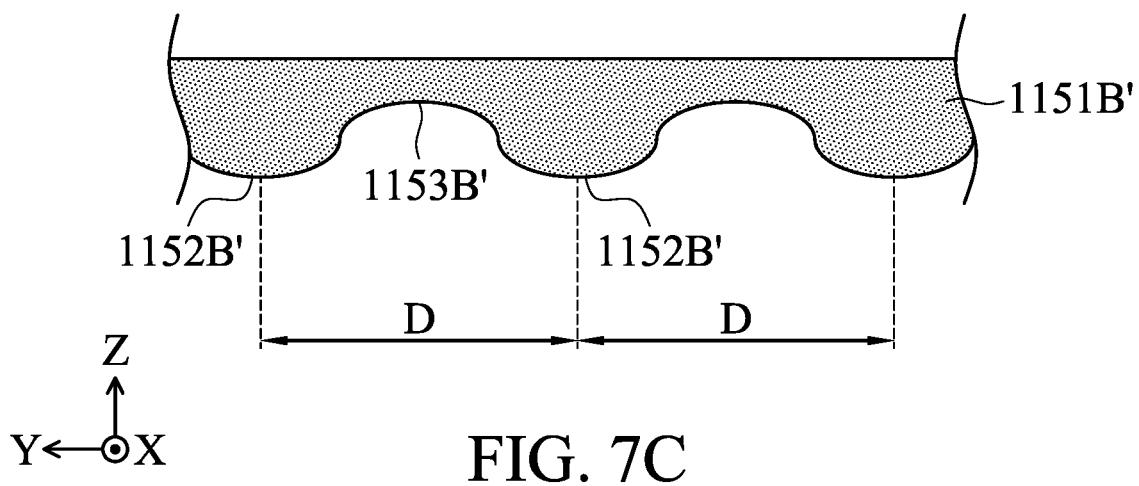
FIG. 7C is a side view of a protruding portion according to another embodiment.

FIG. 7C is a side view of the protruding portion 1151B' according to another embodiment. As shown in FIG. 7C, the protruding portion 1151B' has a plurality of convex portions 1152B' and a plurality of concave portions 1153B'. The plurality of convex portions 1152B' are spaced apart by a fixed distance D. The concave portions 1153B' are located between the convex portions 1152B', respectively. Therefore, when viewed in the direction perpendicular to the main axis (the X-direction), the protruding portion 1151B' presents a wavy shape.

The relative positions and size relationship of the components in the present disclosure may allow the driving mechanism achieving miniaturization in specific directions or for the entire mechanism. The first guide component of the present invention is integrally formed with the first housing, which can achieve the effect of miniaturization. The contact component may cover on the first guide component. The first guide component may include protruding portions. The movable portion includes a first notch and a second notch. All of the above arrangements reduce the friction between the first guide component and the movable portion, thereby enabling the optical component driving mechanism to have better performance. The second guide component is made of metal, which may provide good support for the movable portion, and withstand part of the impact when the optical component driving mechanism is impacted, so as to avoid damage to the driving assembly.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical component driving mechanism, comprising:
   a fixed portion;
   a movable portion arranged along a main axis with the fixed portion, wherein the movable portion is movable relative to the fixed portion; and
   a driving assembly for driving the movable portion to move relative to the fixed portion;
   wherein the fixed portion comprises a first guide component to guide the movable portion to move relative to the fixed portion;
   wherein the movable portion comprises a receiving portion for containing the first guide component, so that the movable portion is movable relative to the fixed portion with the guidance of the first guide component;
   wherein the movable portion comprises a first notch located on the same side of the movable portion as the receiving portion.

2. The optical component driving mechanism as claimed in claim 1, wherein the first guide component comprises a plurality of protruding portions, and when the movable portion moves relative to the fixed portion, the receiving portion moves along the main axis in a manner that contains the first guide component and makes contact with the first guide component.

3. The optical component driving mechanism as claimed in claim 2, wherein the protruding portions protrude from opposite sides of the first guide component, and the protruding portions have a shape of a long bar extending along the main axis.

4. The optical component driving mechanism as claimed in claim 2, wherein the protruding portions comprise a plurality of convex portions and a plurality of concave portions, the plurality of convex portions are spaced a fixed distance apart, and the plurality of concave portions are each located between each of the protruding portions, wherein the protruding portions present a wavy shape when viewed in a direction perpendicular to the main axis.

5. The optical component driving mechanism as claimed in claim 1, further comprising a second guide component, wherein the movable portion comprises a first opening and a plurality of second openings, the driving assembly passes through the first opening, and the second guide component passes through the second openings.

6. The optical component driving mechanism as claimed in claim 5, wherein the movable portion comprises a first side and a second side, wherein the first side and the second side are respectively located on opposite sides of the movable portion, the receiving portion is positioned on the first side, and the first opening and the second openings are positioned on the second side.

7. The optical component driving mechanism as claimed in claim 5, wherein the fixed portion comprises a third opening, wherein the driving assembly passes through the third opening, and the first opening and the third opening at least partially overlap when viewed along the main axis.

8. The optical component driving mechanism as claimed in claim 7, further comprising a first buffer component and a second buffer component, wherein the fixed portion further comprises a ring structure, the first buffer component is located between the driving assembly and the ring structure, and the second buffer component is located between the driving assembly and the third opening.

9. The optical component driving mechanism as claimed in claim 8, wherein the ring structure surrounds the driving assembly to position the driving assembly.

10. The optical component driving mechanism as claimed in claim 1, further comprising a strengthening portion embedded in the fixed portion.

11. The optical component driving mechanism as claimed in claim 10, further comprising a circuit assembly electrically connected to the strengthening portion.

12. The optical component driving mechanism as claimed in claim 1, wherein the movable portion comprises a plurality of first stopper components and a plurality of second stopper components, the fixed portion comprises a front wall and a rear wall, wherein the front wall is parallel to the rear wall, the first stopper components contact the front wall when the movable portion moves into a first limit position, the second stopper components contacts the rear wall when the movable portion moves into a second limit position.

13. The optical component driving mechanism as claimed in claim 1, further comprising a sensing assembly for sensing the movement of the movable portion relative to the fixed portion, wherein the sensing assembly comprises a sensing component and a magnetic component, the sensing component is disposed on the fixed portion, and the magnetic component is disposed on the movable portion.

14. The optical component driving mechanism as claimed in claim 1, wherein the first guide component is formed on the fixed portion by injection molding.

15. An optical component driving mechanism, comprising:
a fixed portion;
a movable portion arranged along a main axis with the fixed portion, wherein the movable portion is movable relative to the fixed portion;
a driving assembly for driving the movable portion to move relative to the fixed portion; and
a contact component;
wherein the fixed portion comprises a first guide component to guide the movable portion to move relative to the fixed portion;
wherein the movable portion comprises a receiving portion for containing the first guide component, so that the movable portion is movable relative to the fixed portion with the guidance of the first guide component;
wherein the contact component covers the first guide component;
wherein when the movable portion moves relative to the fixed portion, the receiving portion moves along the main axis in a manner that contains the first guide component and makes contact with the contact component.

16. An optical component driving mechanism, comprising:
a fixed portion;
a movable portion arranged along a main axis with the fixed portion, wherein the movable portion is movable relative to the fixed portion;
a driving assembly for driving the movable portion to move relative to the fixed portion; and
a second guide component;
wherein the fixed portion comprises a first guide component to guide the movable portion to move relative to the fixed portion;
wherein the movable portion comprises a first opening and a plurality of second openings, the driving assembly passes through the first opening, and the second guide component passes through the second openings;
wherein the movable portion further comprises a second notch located between the second openings.

17. An optical component driving mechanism, comprising:
a fixed portion;
a movable portion arranged along a main axis with the fixed portion, wherein the movable portion is movable relative to the fixed portion;
a driving assembly for driving the movable portion to move relative to the fixed portion;
a second guide component;
a first elastic component; and
a second elastic component;
wherein the fixed portion comprises a first guide component to guide the movable portion to move relative to the fixed portion;
wherein the movable portion comprises a first opening and a plurality of second openings, the driving assembly passes through the first opening, and the second guide component passes through the second openings;
wherein the first elastic component and the second elastic component are positioned in the first opening and surrounding the driving assembly, wherein the driving assembly is movably connected to the movable portion via the first elastic component and the second elastic component.

18. The optical component driving mechanism as claimed in claim 17, further comprising an adhesive component disposed between the first opening and the first elastic component, to fix the first elastic component.

* * * * *